(12) United States Patent
Wheatley

(10) Patent No.: US 10,955,021 B2
(45) Date of Patent: Mar. 23, 2021

(54) METHOD OF MAKING CARBON FIBER WAVE SPRING

(71) Applicant: Donald E. Wheatley, Holland, MI (US)

(72) Inventor: Donald E. Wheatley, Holland, MI (US)

( * ) Notice: Subject to any disclaimer, the term of this patent is extended or adjusted under 35 U.S.C. 154(b) by 318 days.

(21) Appl. No.: 16/190,228

(22) Filed: Nov. 14, 2018

(65) Prior Publication Data

US 2019/0162265 A1 May 30, 2019

Related U.S. Application Data

(60) Provisional application No. 62/591,552, filed on Nov. 28, 2017.

(51) Int. Cl.
| | |
|---|---|
| *B29C 65/74* | (2006.01) |
| *B29C 70/46* | (2006.01) |
| *B29C 70/32* | (2006.01) |
| *B29C 53/56* | (2006.01) |
| *B29C 43/02* | (2006.01) |
| *F16F 1/366* | (2006.01) |
| *B29L 31/00* | (2006.01) |
| *F16F 1/34* | (2006.01) |
| *F16F 1/02* | (2006.01) |
| *B21D 11/10* | (2006.01) |
| *B21D 53/16* | (2006.01) |
| *F16F 1/32* | (2006.01) |

(52) U.S. Cl.
CPC ............... *F16F 1/34* (2013.01); *B21D 11/10* (2013.01); *B21D 53/16* (2013.01); *B29C 43/021* (2013.01); *B29C 53/56* (2013.01); *B29C 53/564* (2013.01); *B29C 65/74* (2013.01); *B29C 70/32* (2013.01); *B29C 70/462* (2013.01); *F16F 1/021* (2013.01); *F16F 1/028* (2013.01); *F16F 1/328* (2013.01); *F16F 1/366* (2013.01); *B29C 2043/029* (2013.01); *B29L 2031/774* (2013.01); *F16F 2224/02* (2013.01); *F16F 2224/0241* (2013.01); *F16F 2226/04* (2013.01); *F16F 2226/041* (2013.01); *F16F 2226/045* (2013.01); *F16F 2234/02* (2013.01); *F16F 2234/06* (2013.01); *F16F 2238/026* (2013.01)

(58) Field of Classification Search
None
See application file for complete search history.

(56) References Cited

U.S. PATENT DOCUMENTS

| | | | | | |
|---|---|---|---|---|---|
| 3,682,466 | A | * | 8/1972 | Huchette | F16F 1/366 267/161 |
| 4,660,811 | A | * | 4/1987 | Muhlhahn | F16F 3/087 188/268 |
| 4,782,992 | A | * | 11/1988 | Doble | B23K 20/00 228/190 |
| 6,068,250 | A | * | 5/2000 | Hawkins | F16F 1/328 267/148 |
| 2007/0183867 | A1 | * | 8/2007 | Hesselmann | F16F 1/328 411/544 |
| 2014/0048991 | A1 | * | 2/2014 | Doetterl | F16F 1/025 267/161 |

* cited by examiner

*Primary Examiner* — Barbara J Musser
(74) *Attorney, Agent, or Firm* — Harness, Dickey & Pierce, P.L.C.

(57) ABSTRACT

A method of making a carbon fiber wave spring includes forming a disc-shaped ring from prepreg carbon fibers. The disc-shaped ring is then formed into a desired wave shape. The disc-shaped ring in the wave shape is then cured to form a wave spring.

4 Claims, 5 Drawing Sheets

METHOD OF MAKING CARBON FIBER WAVE SPRING

CROSS-REFERENCE TO RELATED APPLICATIONS

This application claims the benefit of U.S. Provisional Application No. 62/591,552, filed on Nov. 28, 2017. The entire disclosure of the above application is incorporated herein by reference.

FIELD

The present disclosure relates to a carbon fiber wave spring and method of making.

BACKGROUND

This section provides background information related to the present disclosure which is not necessarily prior art.

Wave springs are commonly used in many applications. The majority of wave springs are made from metal which is subject to corrosion and fatigue. Accordingly, it is desirable to provide a wave spring and method of making that is not subject to corrosion and fatigue.

SUMMARY

This section provides a general summary of the disclosure, and is not a comprehensive disclosure of its full scope or all of its features.

A method of making a carbon fiber wave spring includes winding a carbon fiber unidirectional prepreg sheet around a mandrel to form a tube-shaped body. A portion of the tube-shaped body is cut into a disc-shaped ring. The disc-shaped ring is formed into a form of a desired wave shape. The disc-shaped ring in the wave shape is then cured to form a wave spring.

According to an alternative embodiment, a method of making a carbon fiber wave spring includes winding a carbon fiber prepreg bundle into a disc-shaped ring; forming the disc-shaped ring into a form of a desired wave shape; and curing the disc-shaped ring in the wave shape to form a wave spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
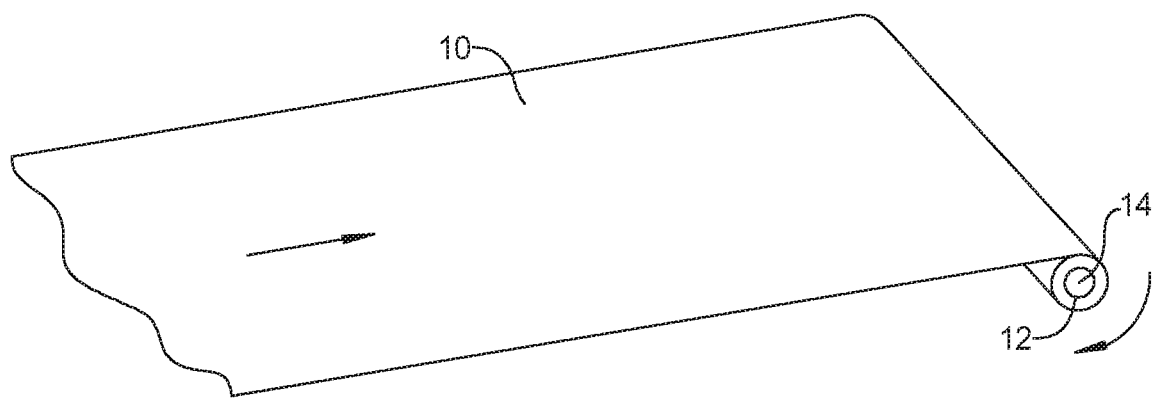
FIG. 1 is a schematic view of a method of forming a tube-shaped body from a sheet of unidirectional carbon fiber prepreg.

With reference to FIG. 1, a unidirectional carbon fiber prepreg sheet 10 is shown for forming a tube shaped body 12. The unidirectional carbon fiber prepreg sheet 10 is a continuous sheet of carbon fibers extending in a single direction and that is pre-impregnated with a thermoplastic or thermoset resin matrix that can be cured at a high temperature. The sheet 10 is wound around a mandrel 14 a predetermined number of times to form the tube shaped body 12 to a desired thickness. The sheet 10 can be a desired width to provide a tube shaped body 12 with a corresponding width. The unidirectional carbon fiber prepreg sheet 10 can be provided with a backing sheet that can be peeled away prior to being wound onto the mandrel 14. The backing sheet is well known in the art and allows the unidirectional carbon fiber prepreg sheet 10 to be stored in a roll without sticking to other layers and to maintain the alignment of the carbon fiber strands.

Figure 2:
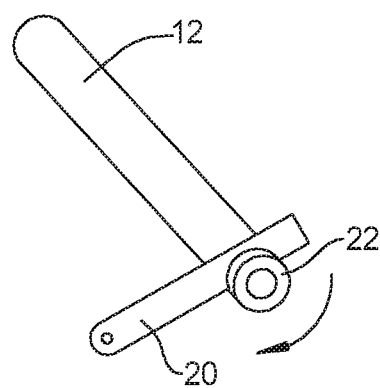
FIG. 2 is a schematic view of slitter device for cutting the tube shaped body into carbon fiber discs.
Figure 3:
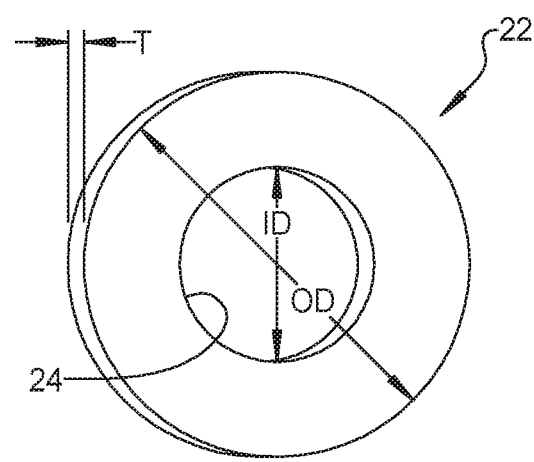
FIG. 3 is a perspective view of a carbon fiber disc made from prepreg.

As shown in FIG. 2, a slitter or other cutting device 20 is used to cut the tube shaped body 12 into individual ring-shaped discs 22. As shown in FIG. 3, the individual ring-shaped discs 22 are formed from the prepreg unidirectional carbon fibers 10 and have a predetermined desired thickness T having an inside diameter ID and an outside diameter OD for a desired carbon fiber wave spring.

Figure 4:
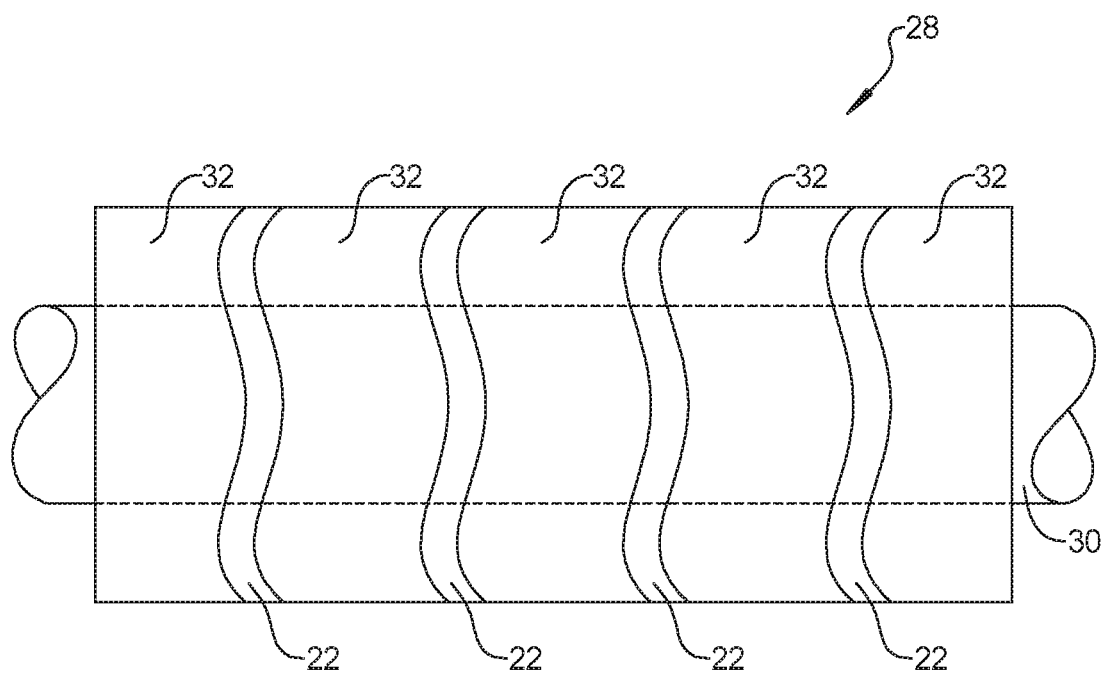
FIG. 4 is a plan view of a forming assembly for forming the carbon fiber disc into a desired wave form.
Figure 5:
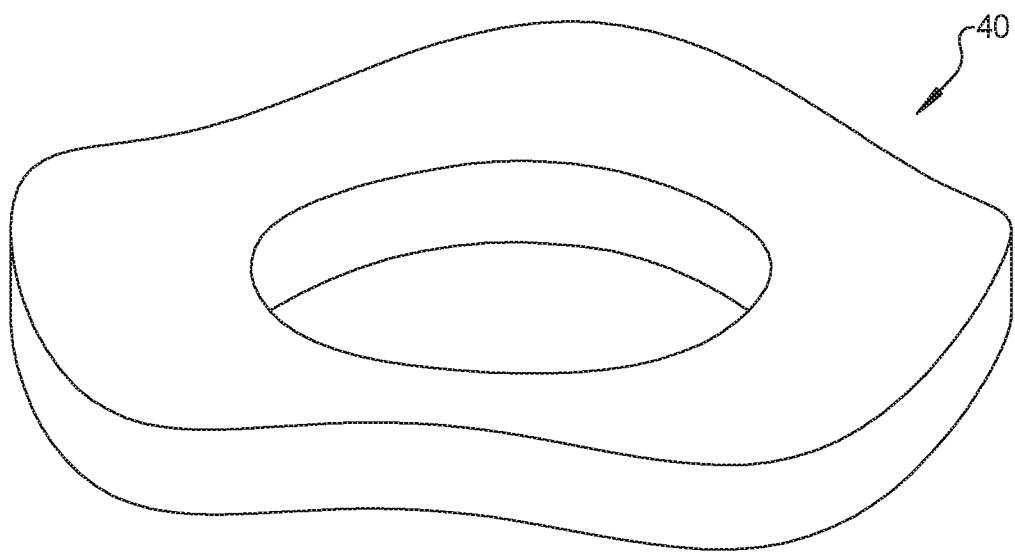
FIGS. 5 and 6 are perspective views of a carbon fiber wave spring.
Figure 6:
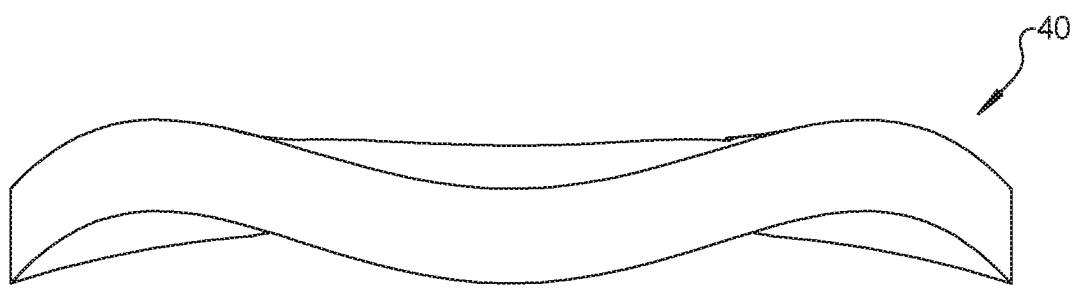
Figure 7:
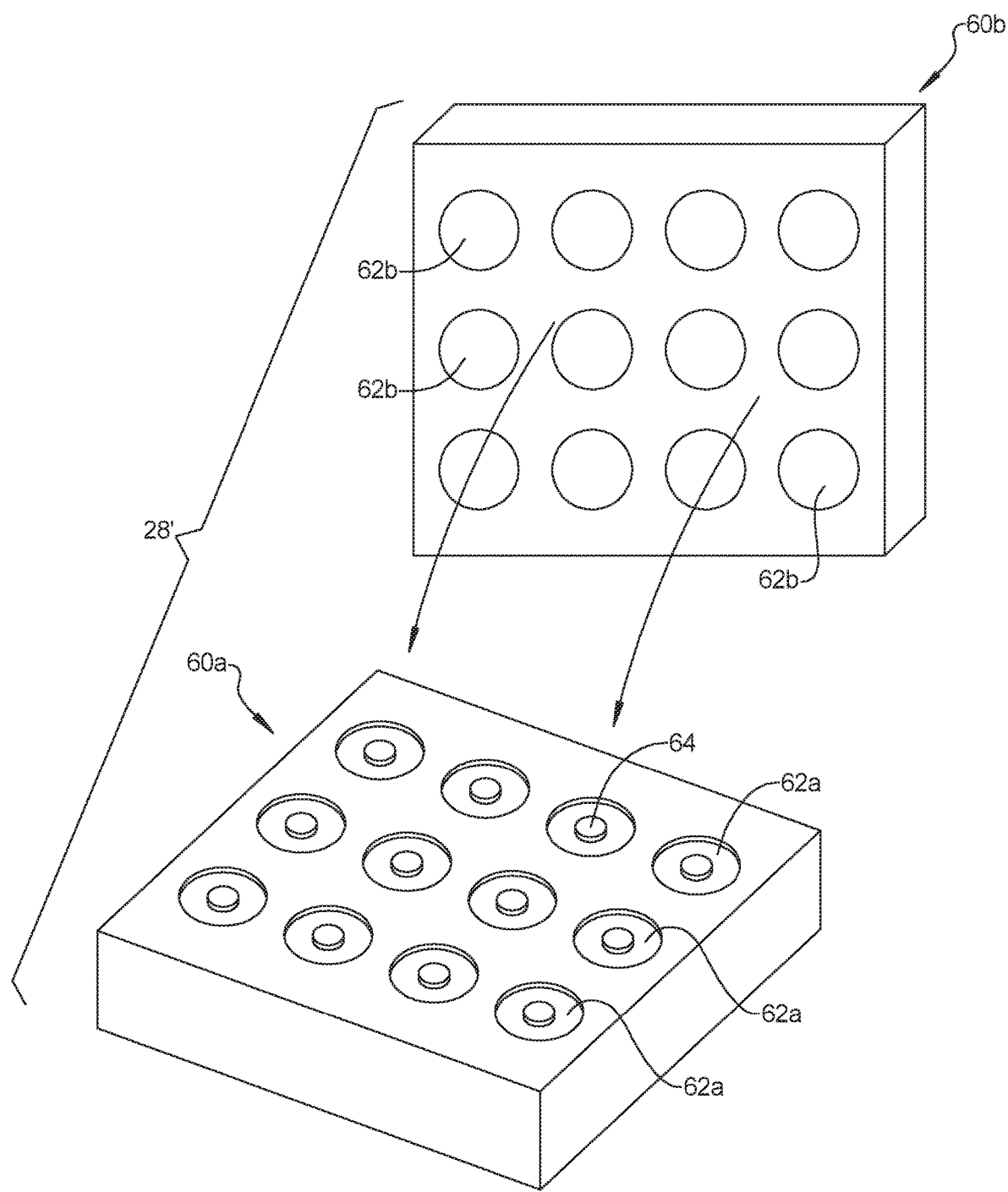
FIG. 7 is a perspective view of an alternative forming assembly for forming the carbon fiber disc into a desired wave form.

With reference to FIG. 4, the individual ring-shaped discs 22 are then formed in a wave shape by a forming assembly 28. According to one aspect of the present disclosure, the ring-shaped discs 22 can be formed Into the desired wave shape by inserting a mandrel 30 into a center aperture 24 of the ring-shaped discs 22 and engaging opposite sides of the ring-shaped discs 22 with wave shaped forming members 32 on opposite sides of the each disc 22. The forming assembly 28 with the individual ring-shaped discs 22 can then be inserted into a heating device such as a furnace in order to cure the resin and thereby permanently shape the carbon fiber wave springs 40 in the desired wave spring shapes such as shown in FIGS. 5 and 6. It should be understood that the forming assembly 28 can take on alternative forms, as shown in FIG. 7. In particular, the forming assembly 28' can include lower and upper dies 60a, 60b each having wave shaped cavities 62a, 62b with a center post within the cavities 62a which can receive and form the ring-shaped discs 22 into a desired wave shape. The forming assembly including the upper and lower die cavities can then be inserted into a heating device or can be provided with its own heating source to cure the ring-shaped discs into the desired wave spring shape 40.

Figure 8:
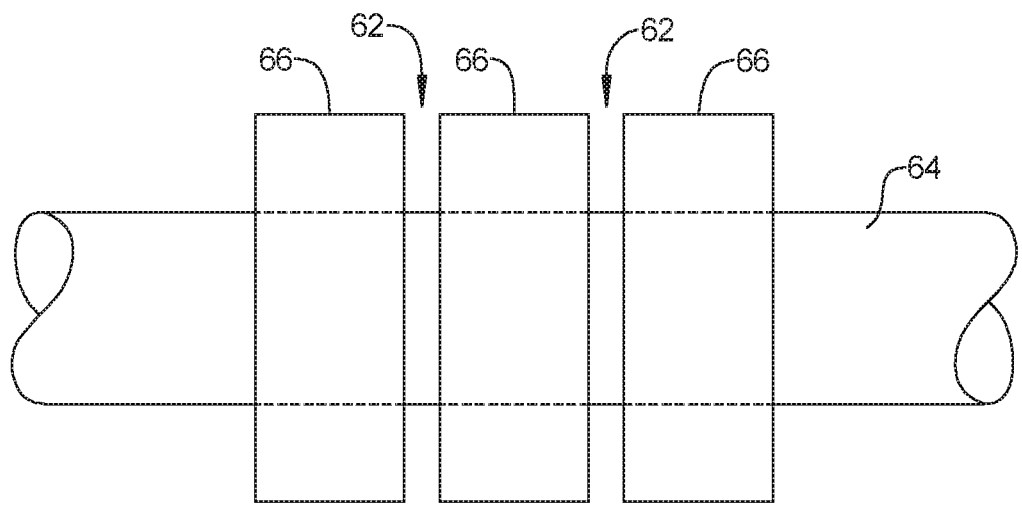
FIG. 8 is a plan view of a winding device for forming individual prepreg carbon fiber discs according to the principles of the present disclosure.
Figure 9:
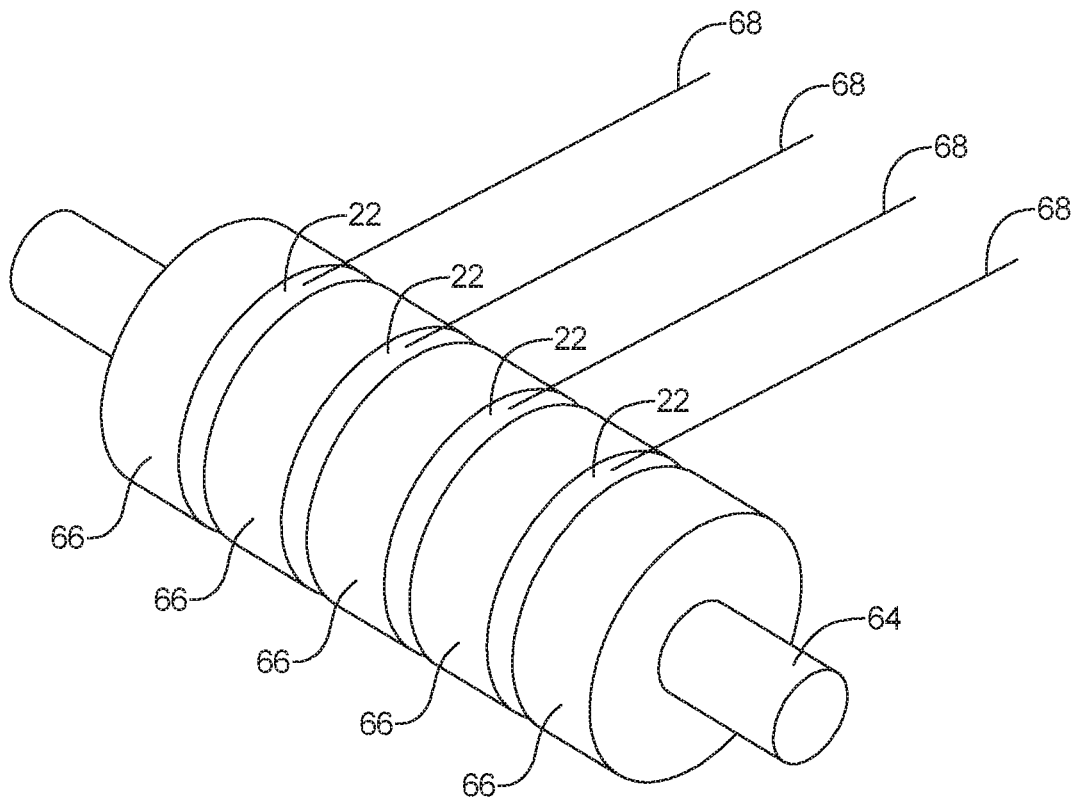
FIG. 9 is a schematic perspective view of the winding device shown in FIG. 8.

As an alternative, as shown in FIGS. 8 and 9, the ring-shaped discs 22 of prepreg carbon fiber can be individually formed by winding impregnated carbon fibers or bundles 68 thereof into a ring-shaped channel 62. Although the ring-shaped channel 62 can be formed in alternative ways, FIG. 8 shows the channels 62 being formed by a mandrel 64 having opposing pairs of ring shaped collars 66 secured on the mandrel 64 at spaced locations. The ring-shaped discs 22 as formed can be removed from the mandrel 64 by removing the ring shaped collars 66 and sliding the discs 22 off of the mandrel 64. The mandrel 64 can be lubricated to facilitate the removal of the ring shaped discs 22. As discussed above, the ring shaped discs 22 can then be formed in a desired shape of a wave spring using one of the forming assemblies as shown in FIGS. 4 and 7, or other forming assembly. The discs 22 can then be cured in a heating device to permanently form the wave springs 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a carbon fiber wave spring, comprising:
    winding prepreg carbon fibers into a disc-shaped ring;
    forming the disc-shaped ring into a form of a desired wave shape; and
    curing the disc-shaped ring in the wave shape to form a wave spring.

2. The method according to claim 1, wherein the step of forming the disc-shaped ring into a desired wave shape includes inserting a mandrel into a center aperture of the disc-shaped ring and engaging opposite sides of the disc-shaped ring with wave shaped forming members on opposite sides of the disc-shaped ring.

3. The method according to claim 1, wherein the step of forming the disc-shaped ring into a desired wave shape includes inserting the disc-shaped ring into a wave shaped cavity of a die assembly.

4. The method according to claim 1, the step of winding prepreg carbon fibers into a disc-shaped ring includes winding bundles of prepreg carbon fibers into a ring-shaped channel a predetermined number of times to form a disc-shaped ring of a desired size.

* * * * *